C. W. MARSH.
ELECTROLYTIC CELL.
APPLICATION FILED APR. 10, 1911.

1,075,362.

Patented Oct. 14, 1913.

3 SHEETS—SHEET 1.

Witnesses:
C. H. Potter
N. P. Leonard

Inventor:
Clarence W. Marsh,
by Byrnes, Townsend & Bickenstein
Attys.

C. W. MARSH.
ELECTROLYTIC CELL.
APPLICATION FILED APR. 10, 1911.
1,075,362.
Patented Oct. 14, 1913.
3 SHEETS—SHEET 2.
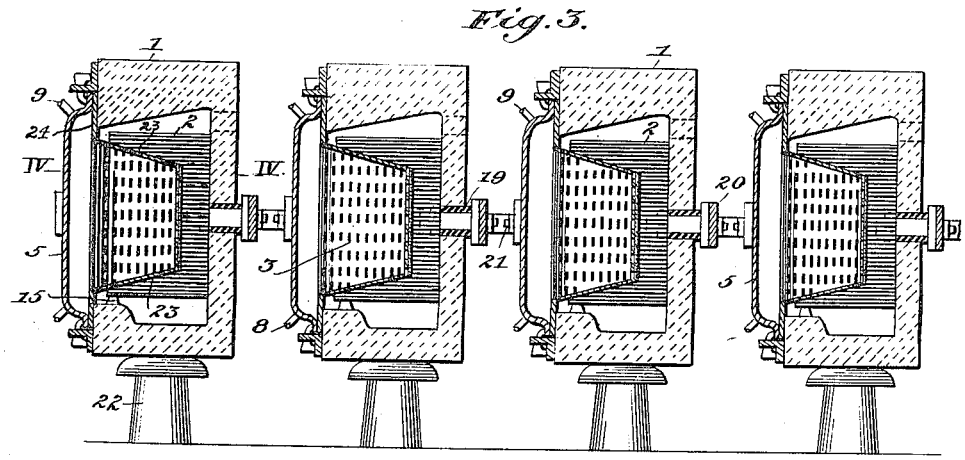
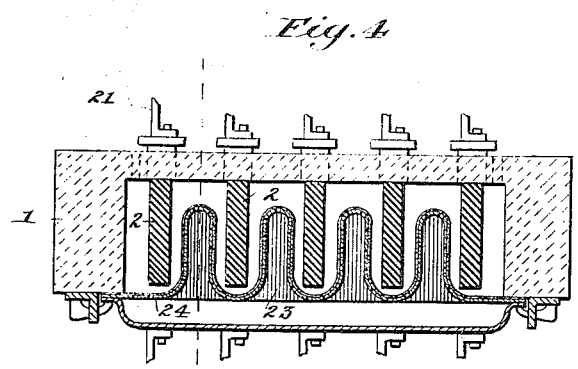
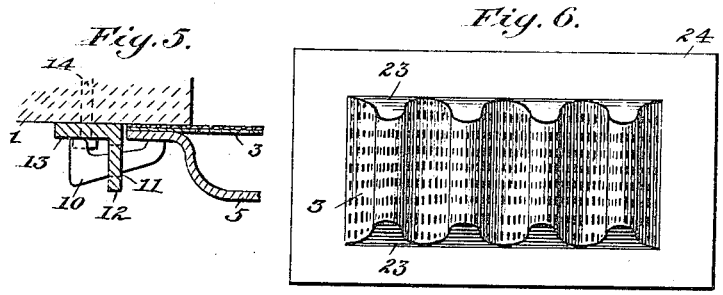
Witnesses:
C. H. Potter
N. P. Leonard
Inventor:
Clarence W. Marsh,
by Byrnes, Townsend & Beckenstein
Att'ys.

C. W. MARSH.
ELECTROLYTIC CELL.
APPLICATION FILED APR. 10, 1911.

1,075,362.

Patented Oct. 14, 1913.

3 SHEETS—SHEET 3.

UNITED STATES PATENT OFFICE.

CLARENCE W. MARSH, OF GREENWICH, CONNECTICUT, ASSIGNOR, BY MESNE ASSIGNMENTS, TO HOOKER ELECTROCHEMICAL COMPANY, OF NEW YORK, N. Y., A CORPORATION OF NEW YORK.

ELECTROLYTIC CELL.

1,075,362.  Specification of Letters Patent.  Patented Oct. 14, 1913.

Application filed April 10, 1911. Serial No. 620,024.

*To all whom it may concern:*

Be it known that I, CLARENCE W. MARSH, a citizen of the United States, residing at Greenwich, in the county of Fairfield and State of Connecticut, have invented certain new and useful Improvements in Electrolytic Cells, of which the following is a specification.

This invention relates to electrolytic cells, and particularly to cells of the diaphragm type intended for the decomposition of chlorids of sodium and potassium.

A primary object of the invention is the provision of a system wherein the electrical connections for individual cells, as well as for a series of cells, are greatly simplified and the weight of metal necessary for such connections is minimized, and wherein the installation is rendered more flexible as regards the capacity of the series-connected units.

The invention likewise contemplates the provision of a novel type of cell of the general class above referred to.

Figure 1:
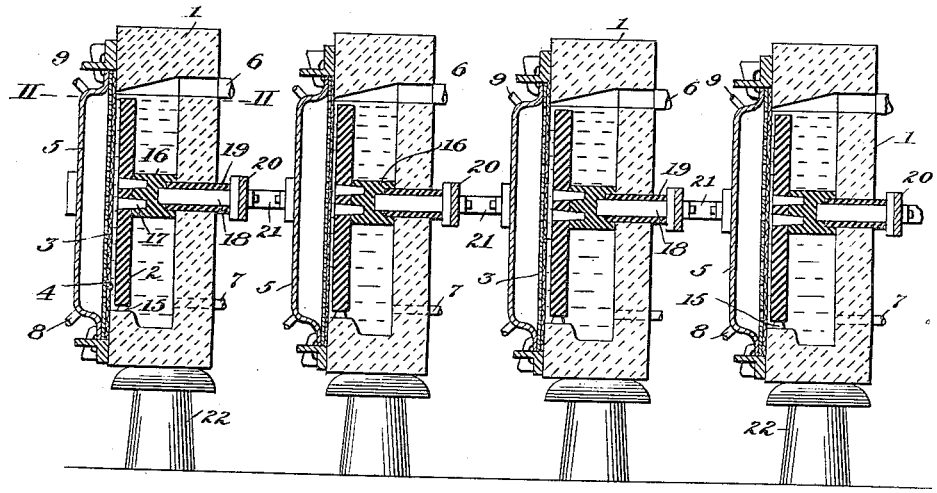
Figure 2:
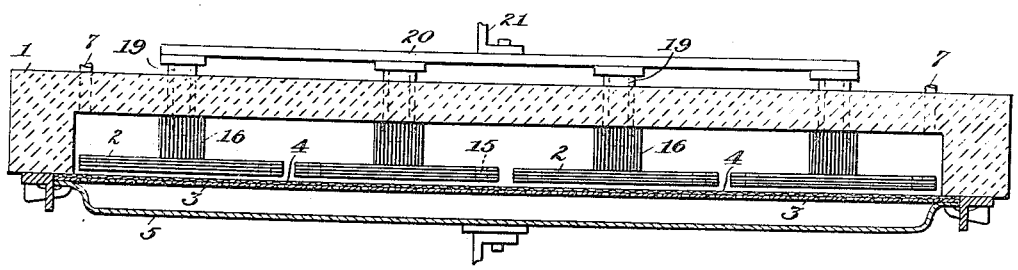
Figure 7:
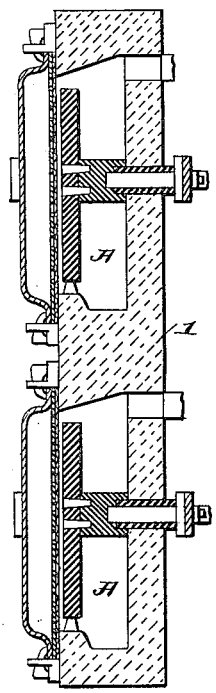
Figure 8:
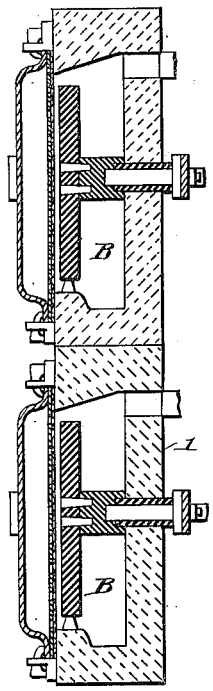
Figure 9:
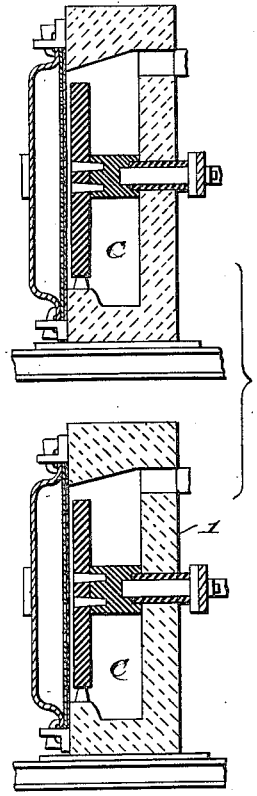
Figure 10:
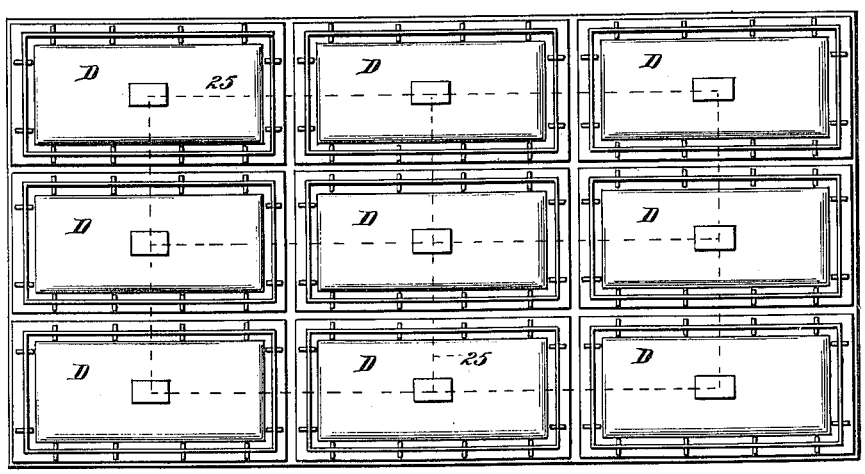

For a full understanding of the invention the same will be described by reference to certain specific embodiments thereof, reference being made to the accompanying drawings wherein:

Figure 1 is a vertical sectional view illustrating one construction of cell in accordance with the invention, and one mode of connecting a number of such cells electrically in series; Fig. 2 is a horizontal section on line II—II of Fig. 1, of one of the cells shown in Fig. 1; Fig. 3 is a vertical sectional view showing a number of cells of modified type connected electrically in series; Fig. 4 is a horizontal section of one of the cells on line IV—IV of Fig. 3; Fig. 5 is a detail view showing one method of securing the cathode compartments to the cell body; Fig. 6 is a face view of the form of cathode plate illustrated in Figs. 3 and 4, viewed from the anode side. Figs. 7, 8 and 9 are vertical sectional views showing a plurality of cell-units of the type illustrated in Fig. 1 assembled in vertically superposed series; and Fig. 10 is an elevation showing one mode of assembling a number of cell units.

Referring to Figs. 1 and 2, the cells therein shown each comprise essentially a hollow or recessed body 1, which may be made in one or more sections as may be desired of reinforced concrete or other suitable material. The body 1 contains the anodes 2 and the electrolyte, and may be regarded as the anode compartment of the cell. The cathode 3 is a perforated steel plate or sheet extending across the open side of the anode compartment, and faced on the side adjacent the anode by a suitable diaphragm 4, which may be of asbestos cloth or the like. 5 represents the cathode chamber, usually of iron or steel, and riveted or otherwise mechanically and electrically secured to the cathode 3. Suitable inlet and discharge openings are provided, those illustrated being the outlet 6 for chlorin and spent brine, brine inlets 7, an outlet 8 for the caustic solution and an outlet 9 for hydrogen. The cathode chamber 5 may be secured to the body 1 by bolts, clamps, wedges, cams or other approved means. The means herein illustrated (see Fig. 5) comprises wedges 10 extending through apertures 11 in the outwardly-extending web 12 of angle bars 13, which are permanently secured to the cell body by means of bolts 14, and together constitute a frame completely encircling the cathode compartments. The wedge members 10 bear upon and support the flanges of the cathode compartments 5. The anodes 2 may be of graphite, and are shown as supported in close proximity to the diaphragm 4, upon insulating blocks 15. The anode connections comprise, in the particular form shown, a graphite block 16 secured to the anode 2 by taper pins 17 also of graphite, and a conductor 18 which may be of aluminum or copper, and which extends through the rear wall of the cell body, being properly coated by insulating material 19 in such manner as to prevent corrosion by the products of electrolysis. 20 represents a bus-bar interconnecting the several anodes of the cell-unit. A short metal coupling 21 detachably connects this bus-bar with the cathode chamber of the cell next in series. A precisely similar provision is made for the series connection of the remaining cells. All cells are shown as carried by insulating supports 22.

Figs. 3, 4 and 6 illustrate a series of cells of modified type, the purpose of the modification being to increase the electrode area in a cell of given dimensions. In this construction the general arrangement is as above described and the parts are similarly numbered. The anodes 2 comprise vertically-set spaced plates extending nearly across the anode compartment, and the cathode 3, together with the diaphragm 4, is provided with a plurality of pockets extending into the interspaces of the anodes, whereby the active cathode area is greatly increased. This construction presents the advantage that both faces of the several intermediate anodes are working surfaces, thus providing a more effective utilization of the anode material. In order to provide the necessary mechanical separation of the anode and cathode compartments the pockets or recesses formed by the extensions of the cathode into the anode chamber are closed both at the top and bottom by an imperforate insulating or insulated plate 23 attached to the imperforate flange 24 of the cathode plate. Such insulated portions of the cathode plate may consist of concrete, metal coated with bakelite or a bakelite composition, or the like. For example they may comprise merely imperforate portions of the cathode plate, having surface coatings of insulation applied thereto. The top and bottom plates 23 are preferably oppositely inclined as shown in Fig. 3 to prevent pocketing of chlorin under the lower and of hydrogen under the upper plate. Obviously the contour of the recessed portions of the cathode plate may be varied as desired, the anode construction being correspondingly modified to present working faces in proximity to the cathodes. The cells thus constructed may be series connected in any desired manner. As illustrated in Figs. 3 and 4 each anode is directly coupled to the cathode plate of the next cell in series, by means of couplings 21.

Fig. 7 illustrates a further application of the principles above described, and shows one mode of mounting or assembling the cell-units to provide increased capacity and other advantages. According to this construction a plurality of cell-units A, A, are formed in a single integral body 1 of concrete. Instead of an integral concrete body for several cell-units, these cell-units may be separate and superposed as illustrated at B, B, in Fig. 8; or they may be spaced either vertically or horizontally or both, being placed for example in superposed, independently supported banks as indicated at C, C, in Fig. 9. In any case the number of cell-units may be multiplied as desired, both vertically and horizontally. For example Fig. 10 shows a structure embodying the nine cell-units D, D, etc., disposed in three vertically superposed series of three cells each. This construction presents certain advantages of great technical importance, some of which are as follows: The individual cells, herein referred to as cell-units, may if desired be of as large dimensions and capacity as is permitted by structural considerations, but such considerations do not limit the size or capacity of the electrical series-unit, which may comprise one, two, or more cell-units, according to the ampere capacity of the cells and of the generators. For example a system may comprise any desired number of series-units such as are illustrated in Fig. 10, the several cell-units D constituting each series-unit being electrically interconnected both on the positive and negative sides as indicated by the dotted lines 25 in such manner as to form a single electrical unit. In such construction any cell-unit may be disconnected from circuit for cleaning or repair without interrupting the operation of the remaining cell-units and without any necessity for bridging over the disconnected cell, the current automatically distributing itself through the other cell-units constituting the series-unit, and the sole effect being a temporary increase in the current density in the other cell-units. This result is obviously independent of the actual physical connection of the cell-units, whether contained in a single body as in Fig. 7, superposed or otherwise in contact as in Fig. 8, or spaced as in Fig. 9.

In the foregoing description and in the following claims the term "cell-unit" is used to designate an individual electrolytic cell; whereas the term "series-unit" is used to designate such number of cell-units as may be connected electrically in multiple, and thereby constitute a single electrical unit in a circuit comprising an electrical series of such units.

I claim:—

1. A cell for the electrolysis of alkali salt solutions, comprising an anode compartment open at one side only, a substantially vertical pervious cathode and diaphragm disposed across said opening, and an anode connection extending horizontally through the wall of the cell opposite said cathode.

2. A plurality of cells for the electrolysis of alkali salt solutions, each comprising an anode compartment open at one side only, a substantially vertical pervious cathode and diaphragm disposed across said opening, and an anode connection extending horizontally through the wall of the cell opposite said cathode, in combination with electrical connections extending between the anode of each cell and the cathode of the adjacent cell in series.

3. A series-unit for the electrolysis of alkali salt solutions, comprising a plurality of vertically superposed cell-units, each cell-unit having an anode compartment open at one side only, a substantially vertical pervious cathode and diaphragm disposed across said opening, and an anode connection extending horizontally through the wall of the cell opposite said cathode.

4. In a system for the electrolysis of alkali salt solutions, a plurality of series-units, each comprising a plurality of vertically superposed cell-units, each of said cell-units having a substantially vertical pervious cathode and diaphragm, and an anode connection extending horizontally through the wall of said cell opposite said cathode.

5. In a system for the electrolysis of alkali salt solutions, a plurality of series-units, each comprising a plurality of vertically superposed cell-units having a common body, each of said cell-units having a substantially vertical pervious cathode and diaphragm, and an anode connection extending horizontally through the wall of said cell opposite said cathode.

6. In a cell for the electrolysis of alkali salt solutions, a cell-body subdivided into a plurality of chambers, each constituting an anode compartment, anodes in said compartments, and substantially vertical pervious cathodes and diaphragms disposed across the openings of said compartments.

7. In an electrolytic cell, a cell-body having in the same side thereof a plurality of chambers, each constituting an anode compartment, anodes in said compartments, and substantially vertical pervious cathodes and diaphragms disposed across the openings of said compartments.

8. In an electrolytic cell, a cell-body having therein a plurality of chambers, each constituting an anode compartment, anodes in said compartments, substantially vertical pervious cathodes and diaphragms disposed across the openings of said compartments, and anode connections extending horizontally through the wall of the cell-body opposite said cathodes.

9. An electrolytic cell comprising anode and cathode compartments, a pervious cathode and diaphragm separating said compartments, said cathode and diaphragm flexed or bent to provide recesses in open lateral and end communication with the anode compartment, and anodes disposed in said recesses.

10. An electrolytic cell comprising anode and cathode compartments, a pervious cathode and diaphragm separating said compartments, said cathode and diaphragm flexed or bent to provide recesses in open lateral and end communication with the anode compartment, anodes disposed in said recesses, and anode connections extending horizontally through the wall of the cell opposite said cathode.

11. A cell for the electrolysis of alkali salt solutions, comprising an anode compartment open at one side only, a substantially vertical pervious cathode and diaphragm disposed across said opening and having pockets extending into said anode compartment, said pockets having imperforate upper and lower walls, and anodes disposed between said pockets.

12. A cell for the electrolysis of alkali salt solutions, comprising an anode compartment open at one side only, a substantially vertical pervious cathode and diaphragm disposed across said opening and having pockets extending into said anode compartment, said pockets having imperforate upper and lower walls, anodes disposed between said pockets, and anode connections extending horizontally through the wall of the cell opposite said cathode.

In testimony whereof, I affix my signature in presence of two witnesses.

CLARENCE W. MARSH.

Witnesses:
EDWARD OSTROM, Jr.,
GEORGE E. VELIE.